(12) United States Patent
Bendel et al.

(10) Patent No.: US 10,232,568 B2
(45) Date of Patent: Mar. 19, 2019

(54) APPARATUS AND METHOD FOR PRODUCING A ROTOR BLADE SPAR CAP

(71) Applicant: SENVION SE, Hamburg (DE)

(72) Inventors: Urs Bendel, Fockbek (DE); Lenz Simon Zeller, Felde (DE); Enno Eyb, Kiel (DE); Tilman Richers, Frankfurt am Main (DE); Jan-Peter Witthus, Schwanewede (DE)

(73) Assignee: Senvion SE, Hamburg (DE)

( * ) Notice: Subject to any disclaimer, the term of this patent is extended or adjusted under 35 U.S.C. 154(b) by 562 days.

(21) Appl. No.: 14/693,141

(22) Filed: Apr. 22, 2015

(65) Prior Publication Data

US 2015/0224721 A1     Aug. 13, 2015

Related U.S. Application Data

(63) Continuation of application No. PCT/EP2013/003058, filed on Oct. 11, 2013.

(30) Foreign Application Priority Data

Oct. 22, 2012 (DE) .................. 10 2012 219 226

(51) Int. Cl.
*B29C 70/48* (2006.01)
*B29C 70/34* (2006.01)
(Continued)

(52) U.S. Cl.
CPC ............ *B29C 70/48* (2013.01); *B29C 70/342* (2013.01); *B29C 70/443* (2013.01); *F01D 5/147* (2013.01);
(Continued)

(58) Field of Classification Search
CPC ....... B29C 70/44; B29C 70/48; B29C 70/465; B29C 70/443; B29C 70/547; Y02P 70/523; F01D 5/147
See application file for complete search history.

(56) References Cited

U.S. PATENT DOCUMENTS 5,052,906 A    10/1991  Seemann
5,993,184 A    11/1999  Morrow
(Continued)

FOREIGN PATENT DOCUMENTS

CA       2734924 A1     9/2011
CN      102186657 A     9/2011
(Continued)

OTHER PUBLICATIONS

Machine Translation EP 2181834 Enno, May 5, 2010.*
International Search Report dated Jan. 22, 2014 in corresponding International Patent Application No. PCT/EP2013/003058.

*Primary Examiner* — Jason D Shanske
*Assistant Examiner* — Maxime M Adjagbe
(74) *Attorney, Agent, or Firm* — Rankin, Hill & Clark LLP

(57) ABSTRACT

An apparatus and method for producing a rotor blade spar cap for a rotor blade of a wind turbine. The apparatus includes a mold, which has a cavity-like depression in cross section, in which material for a rotor blade spar cap can be placed, and a sheet-like mold covering for sealing off the depression. The depression has side walls, an opening bounded by the side walls and a base area between the side walls. In accordance with the method, fiber material and/or fiber-reinforced material is placed in the depression of the mold such that the material finishes flush with the side walls with respect to the height of the rotor blade spar cap, the depression is sealed off by the sheet-like mold covering, the
(Continued)

material is fused together to form the rotor blade spar cap and the rotor blade spar cap is removed from the mold.

13 Claims, 2 Drawing Sheets

(51) Int. Cl.
*B29C 70/44* (2006.01)
*F01D 5/14* (2006.01)
*B29C 70/52* (2006.01)
*B29L 31/08* (2006.01)
*B29K 105/08* (2006.01)

(52) U.S. Cl.
CPC ........ *B29C 70/52* (2013.01); *B29K 2105/089* (2013.01); *B29L 2031/082* (2013.01); *B29L 2031/085* (2013.01); *Y02E 10/721* (2013.01); *Y02P 70/523* (2015.11)

(56) References Cited

U.S. PATENT DOCUMENTS

| | | | | |
|---|---|---|---|---|
| 7,081,218 B2 * | 7/2006 | Sekido | ................. | B29C 70/443 |
| | | | | 264/102 |
| 8,877,116 B2 | 11/2014 | Grabau | | |
| 2010/0196637 A1 * | 8/2010 | Lippert | ................. | B29C 70/345 |
| | | | | 428/36.1 |
| 2011/0135486 A1 * | 6/2011 | Bendel | ................. | B29C 70/226 |
| | | | | 416/230 |
| 2012/0093656 A1 * | 4/2012 | Esaki | .................... | F03D 1/0675 |
| | | | | 416/229 R |

FOREIGN PATENT DOCUMENTS

| | | |
|---|---|---|
| DE | 19926896 A1 | 12/2000 |
| DE | 60315054 T2 | 11/2007 |
| DE | 102007013987 A1 | 2/2008 |
| DE | 102008055771 A1 | 5/2010 |
| DE | 102011003378 A1 | 8/2012 |
| EP | 2181834 A2 | 5/2010 |

* cited by examiner

APPARATUS AND METHOD FOR PRODUCING A ROTOR BLADE SPAR CAP

CROSS-REFERENCE TO RELATED APPLICATIONS

This application is a continuation of PCT/EP2013/003058, filed Oct. 11, 2013, and claims priority to German Pat. App. No. 10 2012 219 226.3, filed Oct. 22, 2012.

BACKGROUND OF INVENTION

Field of Invention

The invention relates to an apparatus for producing a rotor blade spar cap for a rotor blade of a wind turbine, comprising a mold, which has a depression like a cavity in cross section, in which material for a rotor blade spar cap can be placed or has been placed, and also a sheet-like mold covering sealing off the depression, wherein the depression has side walls, an opening bounded by the side walls and a base area between the side walls. The invention also relates to a method for producing a rotor blade spar cap for a rotor blade of a wind turbine and also to a rotor blade spar cap that is produced or can be produced by the method.

Brief Description of Related Art

Rotor blade spar caps have so far usually been produced on molds which either are flat, and thus substantially form the base for the spar cap material, or have a depression that is much deeper than the thickness of the rotor blade spar cap to be produced.

In the case of a planar area without borders, sandwich cores are used for stabilization at the leading edge and the trailing edge of the spar cap and remain in the rotor blade spar cap after demolding.

In the case of a cavity-like mold, that is to say a mold with a depression, the borders are higher than the spar cap material. Sandwich cores are not provided, just unidirectional glass fibers or other fibers. In this case, a vacuum film is placed on the spar cap material for resin infusions, the film standing up slightly at the corners or the borders of the side walls to provide coverage, and so at the corners or borders there form cross-sectional triangles or triangular voids, which during the infusion with the resin material fill with resin and sometimes even take in individual fibers.

In both cases, that is to say with the use of planar areas without borders and with the previously customary cavity-like molds, it is necessary to laboriously trim the rotor blade spar cap after demolding, since either the cross-sectionally triangular undesired resin and fiber projections have to be removed or the outer edges of the sandwich cores, which are likewise encapsulated irregularly in resin, have to be brought back into the desired form.

BRIEF SUMMARY OF THE INVENTION

The invention is therefore based on the object of providing an apparatus and a method with which rotor blade spar caps can be produced efficiently and with a high degree of reliability in terms of the process and a high level of producibility, and also to a rotor blade spar cap that can be produced by the method.

This object is achieved by an apparatus for producing a rotor blade spar cap for a rotor blade of a wind turbine, comprising a mold, which has a depression like a cavity in cross section, in which material for a rotor blade spar cap can be placed or has been placed, and also a sheet-like mold covering sealing off the depression, wherein the depression has side walls, an opening bounded by the side walls and a base area between the side walls, developed in such a way that a height of the side walls corresponds to a height of the sides of the rotor blade spar cap.

The use according to the invention of a cavity-like depression in which the side walls are just the same height as the side walls of the spar cap material and the spar cap assembly makes it possible for the first time to seal off the depression with the spar cap material by a sheet-like mold covering, in particular a vacuum-tight film, so as to achieve a flush and well-defined planar mold on which there no longer forms any cross-sectionally triangular fiber and resin flash, in particular no such flash that can contain fibers. There is consequently also no longer the need for laborious trimming. If anything, a few isolated lugs formed by overflowing resin, very minor because of the mold according to the invention, still have to be knocked off, but this does not require anything like the effort involved in full trimming.

Particularly for the case where the fusing together of the rotor blade spar cap in the mold takes place by means of a resin infusion process, it is advantageously provided that the depressed base area has a further-depressed feed channel, which is covered in particular by a sheet-like channel covering permeable to feed material, wherein a suction means, in particular a suction pipe or a suction channel, is arranged or can be arranged between the material for the rotor blade spar cap and the mold covering. Resin is consequently introduced over the entire length of the depression in the feed channel into the base area of the mold. The suction means arranged under the covering, that is to say in particular the vacuum-tight film, generates a negative pressure, which sucks the resin material or feed material introduced through the feed channel upward, and so the spar cap material is impregnated with the feed material, that is to say in particular the resin.

It is preferably provided that the feed channel in the base area is arranged on one side of the depression and the suction means is arranged or can be arranged on a side of the depression that lies diagonally opposite the feed channel in the cross section of the depression. The diagonal arrangement in the cross section of the depression is particularly advantageous since the lateral offsetting of the suction means in relation to the feed channel has the effect that the liquid feed material, that is to say in particular the resin, is also distributed uniformly in the lateral direction. This is more favorable than when there is a central arrangement of both the feed channel and the suction means, in which the lateral regions of the spar cap assembly are impregnated less with resin than the central region arranged directly between the feed channel and the suction means.

Advantageously included is a flow promoter, which is arranged on the base area of the depression, on the sheet-like channel covering in the direction of the opposite side wall, wherein further material layers, in particular peel plies, perforated films and/or absorbent nonwovens, are arranged or can be arranged under and/or over the material of the rotor blade spar cap. The flow promoter helps here to distribute feed material uniformly on the underside. Further material layers provide a uniform distribution both of the feed material and of the applied vacuum and provide that the resin material is not sucked away by the suction means. The sheet-like channel covering for the feed channel preferably consists of a perforated plate or a perforated film.

In an advantageous development, at least one removable guide body is included for at least one border of the depression. In this case, the guide body can be removed after the fusing together of the rotor blade spar cap, thereby facilitating the demolding of the rotor blade spar cap. Such a guide body may comprise part of a side wall or an entire side wall.

Preferably included is a semipermeable membrane, which is arranged under the mold covering, wherein the membrane is sealed off with respect to the mold covering and the membrane and the mold covering enclose the suction means between them. Consequently, the vacuum that is introduced by the suction means can act through the semipermeable membrane and suck in resin or feed material, but the feed material cannot penetrate through the semipermeable membrane into the suction means.

The object on which the invention is based is also achieved by a method for producing a rotor blade spar cap for a rotor blade of a wind turbine that is distinguished by the fact that fiber material and/or fiber-reinforced material for a rotor blade spar cap is placed in a cavity-like depression of a mold of a previously described apparatus according to the invention such that the material finishes flush with side walls of the depression with respect to its height, the depression is sealed off by the sheet-like mold covering, the material is fused together to form the rotor blade spar cap and then the rotor blade spar cap is removed from the mold.

In the case of this method, the trimming step can be omitted, since the rotor blade spar cap already has its final form and there is no flash that could in particular contain fiber material.

The fiber material and/or fiber-reinforced material preferably comprises dry fiber fabrics, prepreg fiber materials and/or pultruded rods of fiber-reinforced material. All of these materials, including the already preimpregnated prepregs and pultruded rods, can also be fused together by means of resin infusion. Thermal fusion, in which the resin material of the resin matrix softens and joins together with the resin material of the neighboring prepregs or rods, is also possible. Pultruded rods have the advantage that in them the fibers are already optimally aligned in parallel and waves cannot form in the spar cap material as a result of exothermic reactions during the setting of the resin. However, the method according to the invention can be carried out with all three types of material mentioned in such a way as to achieve the advantages according to the invention.

It is likewise possible and advantageous within the scope of the method according to the invention that, at the leading edge and/or the trailing edge of the rotor blade spar cap, bodies of a core material, in particular of balsa or foam, are first inserted into the depression, and then the fiber material and/or the fiber-reinforced material is placed between said bodies. In this case, a composite rotor blade spar cap, which likewise no longer has to be trimmed, can be produced. The bodies of the core material also lie against the side walls of the depression, and so the form of the rotor blade spar cap is once again determined by the depression and there is no need for subsequent trimming. The flush finish with respect to the height of the side walls and the thickness of the spar cap material in the region of the side walls of the depression mean that the other problems with respect to upwardly projecting flash also do not occur.

The fusing together of the fiber material or of the fiber-reinforced material in the depression preferably takes place by means of resin infusion, which flows in through a feed channel in the base area of the depression, in particular on one side of the base area.

Likewise advantageously, material layers that remain as an outer layer of the rotor blade spar cap after demolding of the rotor blade spar cap following its production are finally placed in the depression, flush with the side walls.

Finally, the object on which the invention is based is achieved by a rotor blade spar cap for a rotor blade of a wind turbine that is produced or can be produced in a previously described method according to the invention.

The features, properties and advantages mentioned in relation to the individual subjects of the invention, that is to say the apparatus, the method and the rotor blade spar cap, also apply to the other subjects of the invention respectively, since they relate to one another.

Further features of the invention are evident from the description of embodiments according to the invention together with the claims and the accompanying drawings. Embodiments according to the invention may implement single features or a combination of a number of features.

BRIEF DESCRIPTION OF THE DRAWINGS

The invention is described below on the basis of exemplary embodiments with reference to the drawings, without restricting the general concept of the invention, reference being expressly made to the drawings with respect to all details according to the invention that are not explained more specifically in the text. In the drawings.

In the drawings, elements and/or parts that are the same or similar are in each case provided with the same reference numerals, and so they are not described from the beginning each time.

DETAILED DESCRIPTION OF THE INVENTION

Figure 1:
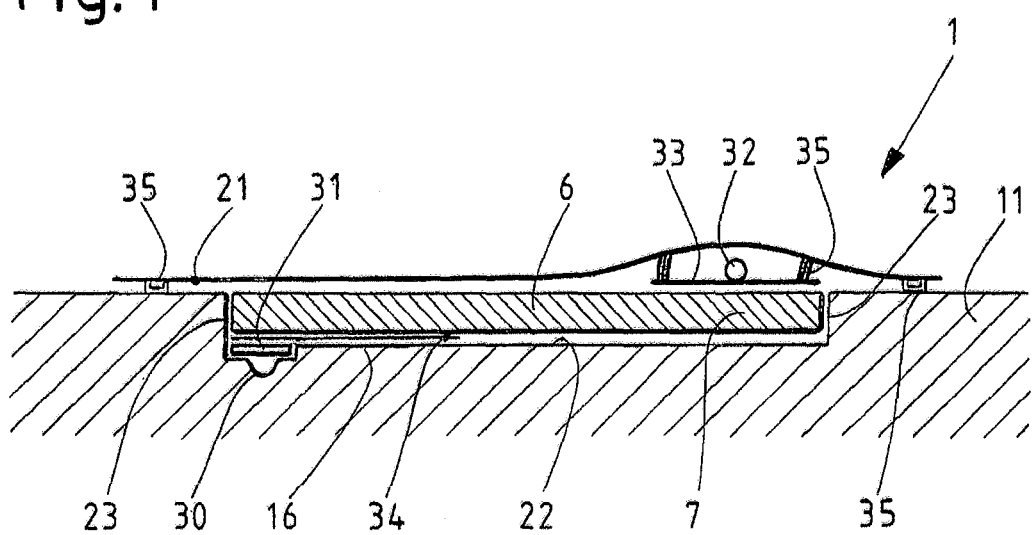
FIG. 1 shows a schematic cross-sectional representation through a first apparatus according to the invention.

In FIG. 1, a first apparatus 1 according to the invention is schematically shown in cross section. A mold 11 has a cross-sectionally rectangular depression 16, in which the fiber material 7 of a rotor blade spar cap 6 has been placed. The surface of the fiber material 7 finishes flush with side walls 23 of the depression 16. The base area 22 of the depression has on one side, which is shown on the left in FIG. 1, a feed channel 30, through which feed material, in particular a resin, can be introduced into the depression 16. The feed channel 30 extends lengthwise through the depression 16. It is covered likewise over its full length by a channel covering 31, which may be a perforated plate or a perforated film. Placed on the channel covering 31 is a flow promoter 34, which helps to distribute liquid feed material in the direction of the other side, i.e. the side that lies opposite the feed channel 30.

Arranged diagonally opposite on the upper side of the fiber material 7 of the rotor blade spar cap 6 is a suction means, to be specific a suction pipe 32, at which a vacuum is applied. By means of the suction pipe 32, in the depression 16 as a whole there is an applied vacuum, the gradient of which is directed toward the suction pipe 32. Consequently, the liquid feed material is sucked from the feed channel 30 to the suction pipe 32. To ensure the negative pressure in the depression 16, the latter is covered by a mold covering 21, in particular a vacuum-tight film. Sealing is laterally ensured in this case by so-called "tacky tape" 35, a vacuum-tight adhesive film or adhesive roll.

In order to prevent resin or feed material being sucked into the suction pipe 32 and clogging it, the suction pipe 32 is protected by a semipermeable membrane 33, which is permeable to air, but not to the feed material. This semipermeable membrane 33 is sealed with respect to the mold covering 21, once again by "tacky tape" 35.

In this way, a pressure gradient that extends through the width and thickness of the depression 16 is produced when liquid feed material enters through the feed channel 30 and when a vacuum or negative pressure is created in the suction pipe 32. Assisted by the flow promoter 34, feed material is sucked up both against the underside of the fiber material 7 and through the fiber material 7 itself over the full width, and so the fiber material 7 is impregnated completely and uniformly.

Figure 2:
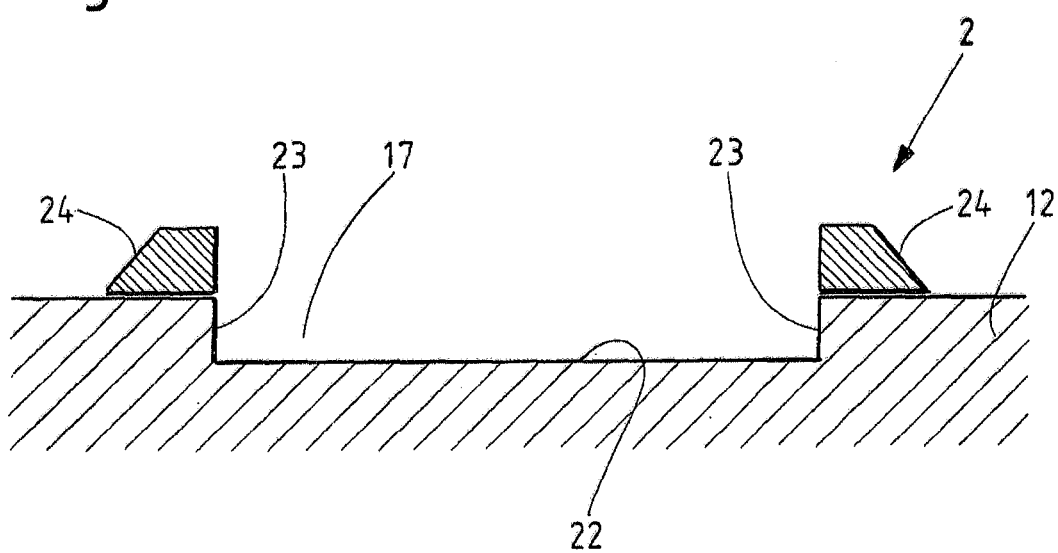
FIG. 2 shows a schematic cross-sectional representation of details of a second apparatus according to the invention.

In comparison with FIG. 1, in FIG. 2 there is shown a second embodiment of an apparatus 2, in which the depression 17 has side walls 23 that are partly formed by removable guide bodies 24. Together with the mold 12, these define the depression 17. After producing the rotor blade spar cap in this mold 12, the guide bodies 24 can be removed, thereby facilitating the demolding of the rotor blade spar cap produced.

Figure 3:
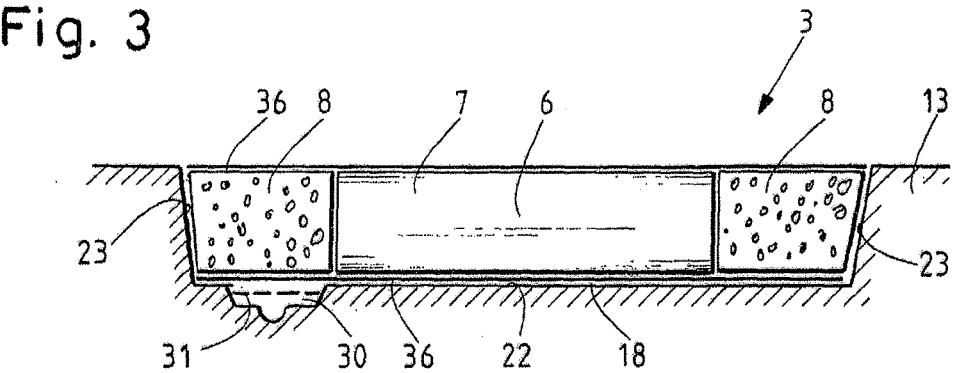
FIG. 3 shows details of a third apparatus according to the invention in schematic cross section.

In FIG. 3, a further exemplary embodiment is represented. The apparatus 3 has a mold 13 with a depression 18, the side walls 23 of which are slightly beveled. Arranged on the left-hand side of the base area 22 of the depression 18 is a suction channel 30 with a channel covering 31, which is formed as a perforated plate. Placed on the entire base area is a first fiber layer 36, on which a core material or sandwich material 8 of balsa wood or a foam has been placed respectively at the leading and trailing edges of the spar cap. The outer side walls of said material are flush with the side walls 23 of the depression 18. The fiber material 7, which may consist of dry fiber fabrics, prepregs or of pultruded rods with fiber-reinforced resin material, has been introduced between the bodies of sandwich materials 8. Applied to the bodies of sandwich material 8 and the body of fiber material 7 is a final fiber layer 36, which finishes flush with the side walls 23 of the depression 18. The other constituent parts of the apparatus 3 are not shown in FIG. 3. The ensemble of fiber layers 36, sandwich material 8 and fiber material 7 forms the rotor blade spar cap 6.

Figure 4:
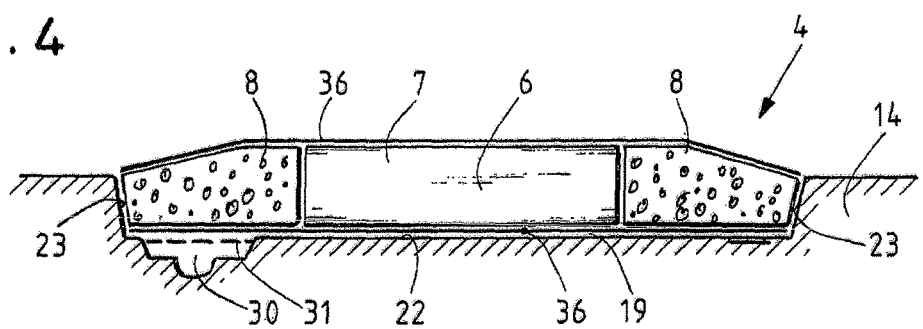
FIG. 4 shows details of a fourth apparatus according to the invention in schematic cross section, FIGS. 5a), 5b) and 5c) show schematic cross-sectional representations through details of apparatuses according to the invention.

FIG. 4 shows in schematic cross section a fourth exemplary embodiment of an apparatus 4 according to the invention, in which the depression 19 is substantially similar to the depression 18 from FIG. 3. The other elements that are represented in FIG. 4 also correspond to those from FIG. 3. As a difference from the exemplary embodiment from FIG. 3, in FIG. 4 there is shown a rotor blade spar cap 6 that is flattened or tapered toward the borders, that is to say toward the side walls 23 of the depression 19. The total thickness of the rotor blade spar cap 6 at its center is consequently greater than the depth of the depression 19. Nevertheless, the upper fiber layer 36 finishes flush with the side walls 23.

Figure 5:
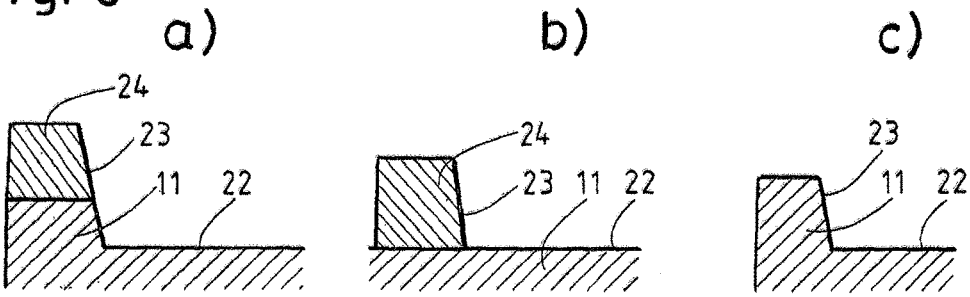

In FIGS. 5a) to 5c, three different possible ways of forming side walls 23 are shown. In FIG. 5a), a lower part of the side wall 23 is formed by part of the mold 11, on which there has been placed a removable guide body 24, which continues the side wall 23 up to its full height. In FIG. 5b), the mold 11 merely forms the base area 22 and the side wall 23 is completely formed as a side area of a removable guide body 23. In FIG. 5c), the entire side wall 23 is part of the mold 11 and no removable guide body is provided.

Figure 6:
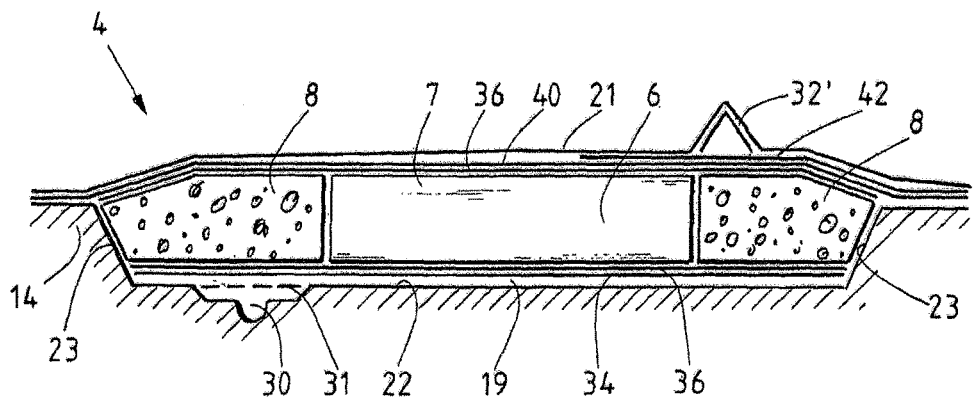
FIG. 6 shows a schematic cross-sectional representation of a mold according to the invention.

In FIG. 6, a more complete representation of the apparatus 4 according to FIG. 4 is shown. In this case, a flow promoter 34 has been laid on the base area 22 of the depression 19, over the entire width, and then the first or lower fiber layer 36 has been placed on top. The flow promoter 34 provides a uniform distribution of the liquid feed material from the feed channel 30 into the depression 19. On the lower fiber layer 36 there have been laid the two bodies of sandwich material 8 and also the central body of fiber material 7. This layer is terminated by an upper fiber layer 36, which finishes flush both with the side of the bodies of sandwich material 8 and with the side walls 23 of the depression 19. Further layers of material, which after the demolding of the rotor blade spar cap 6 do not remain with it, however, have been placed on the fiber layer 36. These are firstly a perforated film 40, instead of which a peel ply for example may also have been arranged. On the side represented on the right in FIG. 6 there is shown an absorbent nonwoven 42, which may also contain a semipermeable membrane and serves for propagating the vacuum that is introduced into the depression 19 through a suction channel 32'. Forming the termination is the sheet-like mold covering 21, which covers the entire depression 19 and part of the rest of the mold.

The way in which the method according to the invention is carried out can be shown by the example of the apparatus 4 in FIG. 6. The spar cap itself consists, according to choice, of dry fabrics of glass fibers, carbon fibers, basalt fibers or natural fibers, which after placing in the mold according to the invention are impregnated with a resin matrix, for example by vacuum infusion, or of prefabricated, cured elements, which consist of a glass-, carbon-, basalt- or natural-fiber-reinforced resin matrix and, after being deposited in the mold according to the invention, are impregnated with a resin matrix, for example by vacuum infusion. Such prefabricated, cured elements may be pultruded rods.

In the case of the variant according to FIG. 6, a resin matrix is introduced by vacuum infusion. For this purpose, the apparatus 4 is supplied with feed material, that is to say in particular resin, through the resin feed channel 30 under one of the sandwich portions 8 of the spar cap assembly, which is bounded by a suitable resin-permeable element as a channel covering 31 in such a way that a flush termination with the remaining surface of the mold is obtained. A flow promoter 34, for example a so-called "continuous mat" or "green mesh" is laid over the feed channel 30 on the surface of the mold, extends in the direction of the opposite border of the mold and may possibly also reach right up to it. Once all the materials have been placed in the mold and on the flow promoter 34, the material placed in is covered by a vacuum construction, which may consist of a peel ply, a perforated film, an absorbent medium (for example a nonwoven or a green mesh) and also a semipermeable membrane and at least one vacuum film. The suction channel 32' is placed between the semipermeable membrane and the at least one vacuum film. In this case, the suction channel 32' is positioned in the vicinity of the border of the mold lying opposite the feed channel 30 and the semipermeable membrane extends from the border of the mold lying close to the vacuum channel 32' significantly in the direction of the opposite border of the mold.

All of the features mentioned, including the features that can be taken from the drawings alone and also individual features that are disclosed in combination with other features, are regarded as essential to the invention on their own and in combination. Embodiments according to the invention may be implemented by single features or a combination of a number of features.

LIST OF REFERENCE NUMERALS 1-4 apparatus
6 rotor blade spar cap
7 fiber material
8 sandwich material
11-14 mold
16-19 depression
21 mold covering
22 base area
23 side wall
24 removable guide body
30 feed channel
31 channel covering
32 suction pipe
32' suction channel
33 semipermeable membrane
34 flow promoter
35 tacky tape
36 fiber layer
40 perforated film
42 absorbent nonwoven

What is claimed is:

1. An apparatus for producing a rotor blade spar cap for a rotor blade of a wind turbine, comprising:
   a mold, which in cross section, includes a depression having a base area for placement of fiber material and/or fiber-reinforced material to be fused together with liquid resin feed material to form the rotor blade spar cap;
   at least one removable guide body placed on the mold, said at least one removable guide body forming at least a portion of a side wall of the depression; and
   a mold covering sheet for sealing off the depression;
   wherein a height of the side wall of the depression is the same as a height of a side of the rotor blade spar cap to be formed in the depression,
   wherein a feed channel is formed in the mold below the base area of the depression,
   wherein the feed channel is covered by a channel covering sheet that is permeable to the liquid resin feed material and flush with the base area of the depression, and
   wherein a suction pipe or a suction channel is arranged between the mold covering sheet and the fiber material and/or fiber-reinforced material to be fused together with the liquid resin feed material to form the rotor blade spar cap.

2. The apparatus as claimed in claim 1, wherein the feed channel is arranged on one side of the depression and the suction pipe or suction channel is arranged on a side of the depression that lies diagonally opposite the feed channel in the cross section of the depression.

3. The apparatus as claimed in claim 1, further comprising a flow promoter, which is arranged on the channel covering sheet and on the base area of the depression in a direction toward an opposite side wall.

4. The apparatus as claimed in claim 1, further comprising a semipermeable membrane, which is arranged under the mold covering sheet, wherein the membrane is sealed off with respect to the mold covering sheet, and wherein the membrane and the mold covering sheet enclose the suction pipe or the suction channel between them.

5. A method for producing a rotor blade spar cap for a rotor blade of a wind turbine, comprising:
   providing the apparatus according to claim 1;
   placing fiber material and/or fiber-reinforced material in the depression such that the fiber material and/or the fiber-reinforced material is flush with the height of the side wall of the depression;
   sealing off the depression with the mold covering sheet;
   fusing together the fiber material and/or of the fiber-reinforced material placed in the depression with liquid resin feed material to thereby form the rotor blade spar cap;
   removing the guide body placed on the mold; and
   demolding of the rotor blade spar cap from the mold.

6. The method as claimed in claim 5, wherein the fiber material and/or fiber-reinforced material comprises dry fiber fabrics, prepreg fiber materials and/or pultruded rods of fiber-reinforced material.

7. The method according to claim 5, wherein further material layers selected from the group consisting of peel plies, perforated films and absorbent nonwovens are arranged under and/or over the material of the rotor blade spar cap.

8. The method as claimed in claim 5, wherein, at a leading edge and/or a trailing edge of the rotor blade spar cap, bodies of a core material are first inserted into the depression, and then the fiber material and/or the fiber-reinforced material is placed between said bodies.

9. The method as claimed in claim 8, wherein the core material is balsa or foam.

10. The method as claimed in claim 5, wherein the fusing together of the fiber material or of the fiber-reinforced material in the depression takes place by means of infusion of the liquid resin feed material, which flows in through the feed channel below the base area of the depression.

11. The method as claimed in claim 10, wherein the feed channel is provided on one side of the base area.

12. The method as claimed in claim 5, wherein material layers that remain as an outer layer of the rotor blade spar cap after demolding of the rotor blade spar cap following its production are placed in the depression, flush with the side walls, in the placing step.

13. A rotor blade spar cap for a rotor blade of a wind turbine produced by the method according to claim 5.

* * * * *